(12) United States Patent
Zilberstein et al.

(10) Patent No.: US 11,853,595 B2
(45) Date of Patent: Dec. 26, 2023

(54) ADAPTIVE MULTI-STREAM CLASSIFICATION FOR DATA STORAGE SYSTEMS

(71) Applicant: Western Digital Technologies, Inc., San Jose, CA (US)

(72) Inventors: Einav Zilberstein, Hod Hasharon (IL); Matar Krizhak, Raanana (IL); Stella Achtenberg, Netanya (IL); Hadas Oshinsky, Hod Hasharon (IL)

(73) Assignee: Western Digital Technologies, Inc., San Jose, CA (US)

( * ) Notice: Subject to any disclaimer, the term of this patent is extended or adjusted under 35 U.S.C. 154(b) by 59 days.

(21) Appl. No.: 17/723,887

(22) Filed: Apr. 19, 2022

(65) Prior Publication Data
US 2023/0333772 A1  Oct. 19, 2023

(51) Int. Cl.
*G06F 12/00* (2006.01)
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 12/0238
See application file for complete search history.

(56) References Cited

U.S. PATENT DOCUMENTS 10,739,996 B1 * 8/2020 Ebsen ................ G06F 16/1727

\* cited by examiner

*Primary Examiner* — Shawn X Gu
(74) *Attorney, Agent, or Firm* — Armstrong Teasdale LLP

(57) ABSTRACT

A stream set classification process may be implemented to classify streams opened by a host device on a data storage device. The data storage device may internally classify the streams into different stream classifications using a set of performance metrics. Stream classifications that cause the data storage device to show the greatest gains when compared with a set of baseline performance metrics for the data storage device and/or when compared with other stream classifications, may be selected by the data storage device and/or the host device for subsequent write operations.

20 Claims, 7 Drawing Sheets

| STREAM TYPE | WRITE/DAY % | REWRITE % | DISCARD % | INVALIDATION % |
|---|---|---|---|---|
| STREAM A | 1% | 3% | 89% | 91% |
| STREAM B | 28% | 0% | 83% | 85% |
| STREAM C | 17% | 28% | 54% | 97% |
| STREAM D | 9% | 1% | 95% | 90% |
| STREAM E | 0% | 4% | 64% | 56% |
| STREAM F | 4% | 95% | 2% | 98% |
| STREAM G | 42% | 10% | 29% | 30% |

| STREAM CLASSIFICATION | STREAM TYPE | WRITE/DAY % | REWRITE % | DISCARD % | INVALIDATION % |
|---|---|---|---|---|---|
| STREAM 1 (>90%) | STREAM A | 1% | 3% | 89% | 91% |
|  | STREAM C | 17% | 28% | 54% | 97% |
|  | STREAM D | 9% | 1% | 95% | 90% |
|  | STREAM F | 4% | 95% | 2% | 98% |
| STREAM 2 (<50%) | STREAM G | 42% | 10% | 29% | 30% |
| STREAM 3 (<50%, <90%) | STREAM B | 28% | 0% | 83% | 85% |
|  | STREAM E | 0% | 4% | 64% | 56% |

| STREAM CLASSIFICATION | STREAM TYPE | WRITE/DAY % | REWRITE % | DISCARD % | INVALIDATION % |
|---|---|---|---|---|---|
| STREAM 1 Small payload (<10%) | STREAM A | 1% | 3% | 89% | 91% |
|  | STREAM E | 0% | 4% | 64% | 56% |
|  | STREAM D | 9% | 1% | 95% | 90% |
|  | STREAM F | 4% | 95% | 2% | 98% |
| STREAM 2 High payload <50% discard | STREAM G | 42% | 10% | 29% | 30% |
| STREAM 3 Med Payload >50% discard | STREAM B | 28% | 0% | 83% | 85% |
|  | STREAM C | 17% | 28% | 54% | 97% |

FIG. 4B

ADAPTIVE MULTI-STREAM CLASSIFICATION FOR DATA STORAGE SYSTEMS

BACKGROUND

A multi-stream data storage device is a data storage device for which a host device creates and/or opens one or more streams in the data storage device. Once the streams are open, the host sends various write requests/operations to the data storage device via a particular stream based on the expected lifetime of the data that is to be written on the data storage device. As the data is received by the data storage device, the data storage device writes the received data to physically related memory blocks. The data storage device also ensures that data for one stream is stored separately from data received via another stream. This technique extends the lifetime and improves the performance of the data storage device by reducing write amplification and garbage collection activities.

SUMMARY

The present application describes a data storage device that dynamically classifies streams specified by and/or received from a host device into various stream classifications consisting of one or more stream sets. Each of the one or more stream sets may include one or more of the original streams specified by the host device. The streams specified by the host device are classified into various stream sets based on internally monitored performance metrics associated with each stream. For example, if the host device opened eight streams on the data storage device, the data storage device may internally classify the eight streams into a stream classification having four different stream sets. Each stream set may be based on or otherwise associated with a particular performance metric.

For example, a first stream set in the stream classification may include two of the original streams specified by the host device. Each stream in the first stream set may have the same or similar performance metrics. A second stream set in the stream classification may also include two of the original streams specified by the host device and each stream in the second stream set may have the same or similar performance metrics. A third stream set in the stream classification may include one original stream specified by the host device while the fourth stream set in the stream classification may include three original streams specified by the host device. The three original streams in the fourth stream set may have the same or similar performance metrics.

When each of the streams have been classified into a stream set, the data storage device determines an efficiency (referred to herein as a gain measurement) of the data storage device when the data storage device writes data to storage blocks (or performs other related operations) using the stream classification. The gain measurement may be determined based on a number of different gain criteria.

The gain measurement associated with the stream classification may be measured or otherwise compared against a baseline efficiency score or value of the data storage device (e.g., how efficiently the data storage device operated prior to classifying the streams specified by the host device into a stream classification). In another example, a gain measurement of one stream classification may be compared against a gain measurement of another stream classification. The data storage device may select and use the stream classification with the highest gain measurement.

Accordingly, the present application describes a method for classifying streams for a data storage device. In an example, the method includes receiving a plurality of streams from a host device. A performance metric for each stream in the plurality of streams is determined. In an example, the performance metric is associated with a performance parameter from a set of predefined performance parameters. The plurality of streams are classified into a stream classification based, at least in part, on the performance metric. The stream classification includes a first stream set and a second stream set. The first stream set includes a first stream from the plurality of streams. The second stream set includes a second stream from the plurality of streams. A gain measurement associated with the stream classification is determined. In an example, the gain measurement is associated with a set of predefined gain criteria. A write operation may be performed on a storage block of the data storage device using the stream classification based, at least in part, on the gain measurement.

The present application also describes a method for classifying streams for a data storage device. In an example, the method includes storing a first performance metric for a first stream in a plurality of streams associated with a host device. The first performance metric is associated with a performance parameter. The method also includes storing a second performance metric for a second stream in the plurality of streams associated with the host device. The second performance metric is associated with the performance parameter. Information corresponding to the first performance metric for the first stream in the plurality of streams is provided to a remote device. Likewise, information corresponding to the second performance metric for the second stream in the plurality of streams is also provided to the remote device. A stream classification is received from the remote device. The stream classification includes one or more stream sets. In an example, at least one of the one or more stream sets includes the first stream and the second stream. Additionally, the first stream and the second stream are included in the at least one of the one or more stream sets based, at least in part, on the first performance metric and the second performance metric. A write operation is performed on a storage block of the data storage device using the stream classification.

Also described is a data storage device. The data storage device includes a controller and a memory communicatively coupled to the controller. The memory stores instructions which, when executed by the controller, perform operations. The operations include performing one or more write operations on storage blocks associated with the data storage device using a first stream classification. In an example, the first stream classification includes a first stream set having one or more streams associated with a host device and a second stream set having one or more streams associated with the host device. The controller determines a gain measurement associated with the first stream classification. The controller also compares the gain measurement associated with the first stream classification to an expected gain measurement threshold. Subsequent write operations are performed on the storage blocks associated with the data storage device using a second stream classification based on the gain measurement associated with the first stream classification falling below the expected gain measurement threshold.

BRIEF DESCRIPTION OF THE DRAWINGS

Non-limiting and non-exhaustive examples are described with reference to the following Figures.

FIG. 3 is a chart that illustrates how streams may be classified according to a performance parameter according to an example.

FIG. 4A is a chart illustrating a first stream classification according to an example.

FIG. 4B is a chart illustrating a second stream classification according to an example.

DETAILED DESCRIPTION

Figure 1:
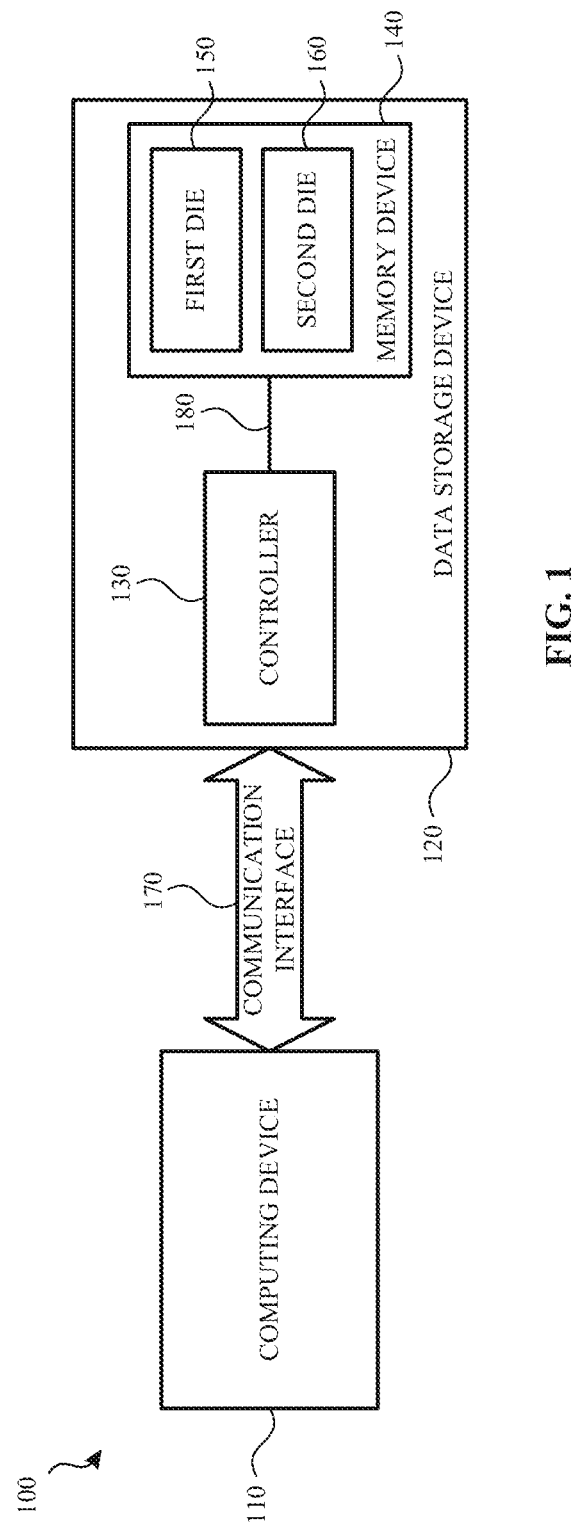
FIG. 1 is a block diagram of a data storage system according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Solid state drives (SSDs) are widely used as a main storage device for a number of different computing devices. Applications include mobile phones, personal computers, and servers to name a few. However, SSDs have a number of drawbacks. For example, a SSD typically writes data to underlying NAND flash memory as the data is received. The SSD does not consider various factors associated with the data such as, for example, the expected lifetime of the data. As data is continuously received and written to the underlying NAND flash memory, the data can become fragmented.

For example, a SSD does not enable data overwrite functionality. As such, an erase operation must precede a new write operation. However, an erase operation erases an entire block of data. In some instances, a particular block of data that is to be erased contains valid data and invalid data due, for example, to the different lifetimes of the data in the particular storage block. Thus, any valid data in the storage block needs to be re-written to a different storage block before the erase operation occurs.

In order to address the above, the SSD initiates a garbage collection process. The garbage collection process moves valid data in a particular storage block to a different storage block. Once the valid data has been moved to the new storage block, the SSD will erase/initialize the storage block from which the valid data was moved. However, each time valid data is written from the storage block to be erased to the new storage block, additional write operations are performed. Thus, although storage utilization is improved, the performance and lifetime of the SSD is negatively impacted due to the increased garbage collection activity and additional write operations.

Multi-stream SSDs address the above by enabling a host device to specify and/or open streams in the SSD. Once the streams are open, the host device sends write operations/requests to the SSD via different streams based on, for example, the expected lifetime of the data to be written. Thus, data in a given storage block associated with the stream will have a similar lifetime. As a result, the data in the given storage block becomes invalid at approximately the same time resulting in reduced garbage collection activities and latency and better write performance over the life of the SSD.

However, the more streams the host device specifies, the more resources (e.g., RAM and storage blocks) are consumed in the SSD. In some cases, the SSD may not have the resources to handle all of the streams specified by the host device. In some applications (e.g., mobile applications) it may not be feasible to add additional RAM and/or storage blocks to address the above as additional RAM and/or storage blocks add additional costs and power requirements.

In other applications, a SSD may ignore stream hints provided by the host device and treat all incoming data as a single stream. Once the data is received, the SSD may separate the data in different storage blocks in the background. However, this approach is not feasible as it increases the program-erase cycles of the SSD which negatively impacts the overall performance and lifetime of the SSD.

In yet other applications, the host device may be limited as to the number of streams it can specify and/or open on the SSD. However, when making a determination regarding the number streams and/or the data to associated with each stream, the host device does not have access to data storage metrics of the SSD. Thus, any selection or merging of streams done by the host device may not be optimal for the SSD.

Although the examples above specifically mention various drawbacks of SSDs, the solutions described herein may be used by any data storage device. In some examples, the solutions described herein may be utilized by resource constrained data storage devices.

Accordingly, it would be advantageous to enable a data storage device to dynamically determine how to reduce the number of streams that the data storage device internally manages while still maintaining the advantages of a multi-stream system. As such, the present application describes a data storage device that dynamically classifies streams specified and/or received by a host device in order to reduce the number of streams internally managed by the data storage device. As part of this process, the data storage device analyzes one or more performance parameters associated with each stream received by the host device. The data storage device classifies the streams from the host device into a stream classification. The stream classification includes one or more stream sets that are organized or classified based on the one or more performance parameters. In an example, each stream set may include one or more of the streams originally specified by the host device. The one or more performance parameters may be predefined and/or known/stored by the data storage device.

When the streams from the host device have been classified into a stream classification, the data storage device performs various write operations (and other related operations) based on the stream classification. For example, the data storage device may treat the streams in a stream set as a single stream write data associated with the stream into the same storage block(s).

The data storage device also determines an efficiency score (referred to herein as a gain measurement) of the data storage device when the data storage device uses the stream classification. The gain measurement may be determined or otherwise measured based on a number of different gain criteria. The gain criteria may be predefined and/or stored by the data storage device. In one example, the gain measurement associated with the stream classification may be measured against a baseline efficiency score of the data storage device (e.g., how efficiently the data storage device operated prior to classifying the streams into the stream classification) . If the gain measurement of the stream classification exceeds an efficiency improvement threshold, the data storage device may internally use the stream classification when performing write operations. For example, the data storage device will direct all writes associated with a first stream set to the same physical storage block(s).

In another example, the data storage device may have determined or otherwise have access to a number of different stream classifications. For example, one or more stream classifications may be predefined (e.g., based on simulated performance metrics and/or workloads associated with a training or learning process/system). In another example, the data storage device may generate or otherwise determine stream classifications over time as a workload of the data storage device changes.

Each stream classification may be based on the same or similar performance parameters and/or different performance parameters. In this example, a gain measurement of one stream classification may be compared against a gain measurement of another stream classification. The data storage device may select and use the stream classification with the highest gain measurement.

Accordingly, the present application has many technical benefits including, but not limited to, improving the efficiency of data storage devices (including resource constrained data storage devices) by enabling the data storage devices to determine and use stream classifications based on internally known performance metrics and gain measurements. Another technical benefit includes extending the lifetime and performance of data storage devices (including resource constrained data storage devices) by reducing a number of garbage collection activities and write operations that would normally be required were the streams from the host device not classified in the manner described herein.

These various benefits and examples will be described in greater detail below with reference to FIG. 1-FIG. 6.

FIG. 1 illustrates an example data storage system 100. The data storage system 100 includes a computing device 110 and a data storage device 120. The data storage device 120 may be part of or otherwise integrated with the computing device 110. In another example, the data storage device 120 may be separate from, or otherwise external to, the computing device 110. The data storage device 120 may be any type of data storage device, drive, module, component, and/or system. For example, the data storage device 120 may be a hybrid hard drive, a solid-state drive, a hard disk drive, and so on. In one example, the data storage device 120 may have limited resources (e.g., RAM and/or storage blocks) based on, for example, an end product that utilizes the data storage device 120 and/or the data storage system 100.

The data storage device 120 may include a controller 130. In an example, the controller 130 includes control circuitry, processing circuitry, software, firmware, or a combination thereof. For example, the controller 130 may include one or more processors, memory devices, data and or power transmission channels/paths, boards, and the like in order to perform the various functions and features described herein.

The controller 130 may be implemented as a system-on-a-chip (SoC), a field-programmable gate array (FPGA), an application-specific integrated circuit (ASIC), and the like. In another example, the controller 130 (or various components of the controller 130) may be mounted on a printed circuit board (PCB). The controller 130 may be configured to receive and/or send various commands. For example, the controller 130 may receive, execute and/or send various commands (e.g., read, write, and/or erase commands) in order to perform aspects of the various examples described herein. The controller 130 may also be configured to dynamically classify streams received or otherwise specified by the computing device 110 into one or more stream classifications, determine gain measurements associated with each stream classification, select which stream classifications to use as well as other processes and operations described herein.

The data storage device 120 may also include a memory device 140 (e.g. volatile and/or non-volatile memory). The memory device 140 (and/or portions of the memory device 140) may also be referred to as a storage medium. The memory device 140 includes a number of storage elements or blocks. In an example, each storage element is a chip or a memory die that is used to store data. In the example shown, the memory device 140 includes a first memory die 150 and a second memory die 160. In an example, the first memory die 150 and the second memory die 160 include non-volatile memory elements such as, for example, NAND flash memory elements and/or NOR flash memory elements. Although two memory dies are shown, the memory device 140 may include any number of storage elements. For example, the storage elements may take the form of solid-state memory such as, for example, 2D NAND, 3D NAND memory, multi-level cell memory, triple level cell memory, quad-level cell memory or any combination thereof.

The controller 130 may communicate with the computing device 110 via a communication interface 170. The communication interface 170 may include hardware such as, for example, wires, pins, traces, connectors, software, firmware, or a combination thereof. Example communication interfaces 170 include a peripheral component interconnect express (PCIe) bus, a serial AT attachment (SATA) bus, and a non-volatile memory express (NVMe) bus.

The communication interface 170 is used to transmit various commands between the computing device 110 and the controller 130. The commands may include data access commands, data storage commands and the like. For example, the controller 130 may receive commands from the computing device 110 via the communication interface 170 and execute the commands on the memory device 140. The controller 130 may be coupled to the memory device 140 via an interface 150 (e.g., one or more lines, pins, wires, traces). In an example, each channel of the interface 150 may be coupled to different portions of the memory device 140.

Figure 2A:
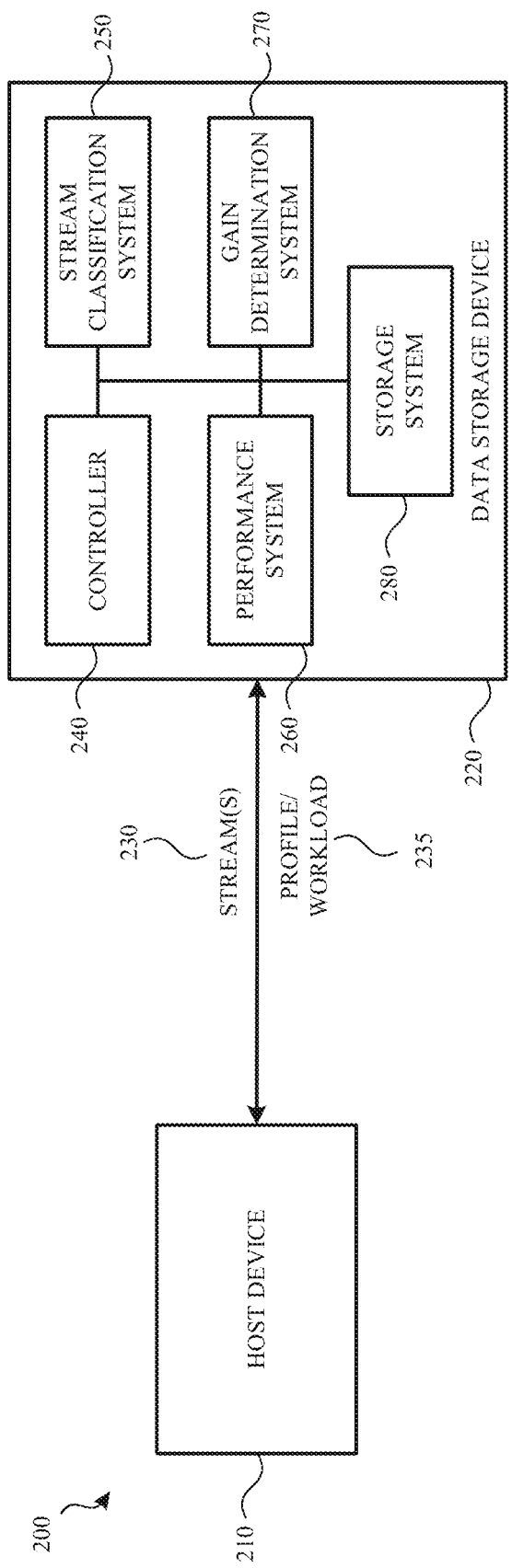
FIG. 2A is a block diagram of a data storage system having a data storage device that internally classifies streams provided by a host device into one or more stream classifications according to an example.

FIG. 2A is a block diagram of a data storage system 200 having a data storage device 220 that internally classifies streams 230 provided by a host device 210 into one or more stream classifications according to an example. The host device 210 may be similar to the computing device 110 shown and described with respect to FIG. 1. Likewise, the data storage device 220 may be similar to the data storage device 120 shown and described with respect to FIG. 1. Additionally, although the host device 210 is shown separately from the data storage device 220, the host device 210 and the data storage device 220 may be integrated in a single device.

In an example, the data storage device 220 is a multi-stream data storage device. As such, the host device 210 may specify and/or open a number of streams 230 on the data storage device 220. In an example, the host device 210 may specify and/or open any number of streams on the data storage device 220. Each write operation requested by the host device 210 may be associated with a particular stream 230. For example, the data associated with a particular stream 230 may expire and/or will be invalidated at the same time or at a similar time.

The host device 210 may be communicatively coupled to the data storage device 220 via a communication interface (e.g., communication interface 170). In some examples, the host device 210 and the data storage device 220 may be communicatively coupled via an application programming interface (API) (e.g., API 245 (FIG. 2B)). The API may be part of or otherwise associated with the communication interface.

In some examples, the API may enable the host device 210 to communicate with and/or send instructions to the data storage device 220. In another example, the API enables the data storage device 220 to communicate with and/or send information to the host device 210. For example, the data storage device 220 may use the API to communicate stream classification information to the host device 210.

In another example, the data storage device 220 may use the API to communicate performance metrics associated with the streams 230 and/or one or more performance parameters by which the streams 230 are analyzed to the host device 210. In yet another example, the data storage device 220 may use the API to communicate gain measurements and/or gain criteria to the host device 210. Using some or all of this information, the host device 210 may perform the required processing to classify the streams 230 into stream classifications such as described herein.

When this information is provided to the host device 210 from the data storage device 220, the host device 210 may use the information to determine a gain measurement of a selected stream classification such as will be described in more detail below. In yet another example, the host device 210 may use information received from the data storage device 220 via the API to compare a gain measurement from a first stream classification to a gain measurement of a second stream classification. The host device 210 may then select the stream classification with the highest gain and provide that information to the data storage device 220 via the API.

In some examples, performance of the data storage device 220 may change based on a profile associated with the host device 210 and/or on a workload associated with the host device 210. For example, the amount of data to be stored on the data storage device 220 and/or the number of streams 230 opened by the host device 210 may be associated with a particular user profile associated with the host device 110 and/or a workload associated with the host device 210. As such, profile and/or workload information 235 may be provided to the data storage device 220 from the host device 210. The data storage device 220 may classify the streams 230 into different stream classifications based on the profile/workload information 235. In another example, the data storage device 220 may dynamically switch (or be instructed by the host device 210 or another remote device to switch) between stream classifications based on a determined or detected profile and/or workload 235. As such, the classification and use of stream classifications may dynamically change based on changing conditions.

The data storage device 220 may include a controller 240, a stream classification system 250, a performance system 260, a gain determination system 270 and a storage system 280. The storage system may be similar to the memory device 140 shown and described with respect to FIG. 1. The controller 240 may provide instructions to each of the systems to enable the systems to work together and classify the streams 230 into one or more stream classifications such as will be explained herein.

Although each of the systems are shown separately, some (or all) of the systems may be combined within the data storage device 220. In another example, some (or all) of the systems shown as being a part of the data storage device 220 may be provided on a remote device (e.g., a cloud computing device). As will be explained in more detail with respect to FIG. 2B, information about the streams 230 (e.g., performance metrics, classification of the streams 230, gain determinations) may be provided to the remote device via an API.

As shown in FIG. 2A, the data storage device 220 may receive data from the host device 210 via one or more streams 230. As the data is received, the data is written into specific storage blocks of the storage system 280. In an example, each stream 230 is associated with one or more storage blocks in the storage system 280. The one or more storage blocks in the storage system 280 may be NAND blocks although other types of storage elements may be used.

As data is received by the data storage system 280, the performance system 230 monitors performance metrics associated with each stream 230. The performance metrics may be based on or otherwise associated with one or more performance parameters. In an example, the one or more performance parameters are predefined and/or are otherwise stored by the storage system 280.

For example, as data is written into the storage blocks, and as other associated operations (e.g., garbage collection operations) are performed, the controller 240 causes the performance system 260 to determine performance metrics of each of the streams 230 based on the one or more performance parameters. As the performance metrics are monitored or otherwise determined by the performance system 260, the performance metrics may be stored in the storage system 280.

In some examples, the performance metrics may be monitored with respect to a profile and/or workload 235. The performance metrics may include characteristics about each stream 230 including, but not limited to, determined or identified patterns, payloads, invalidations, and garbage collection activities.

For example, the performance system 260 may determine performance metrics for each stream using one or more of the following performance parameters: 1) an amount of write operations/payloads and invalidations of a stream; 2) an amount (e.g., a percentage) of rewrite invalidations and discard invalidations (e.g., types of invalidation) of a stream; 3) an amount (e.g., a percentage) of valid counts of a stream (in total and/or per storage block associated with the stream); 4) an amount (e.g., a percentage) of invalidated valid counts of a stream (in total and/or per storage block associated with the stream); 5) a pattern of the stream (e.g., a percentage of the stream that has a random pattern and/or a percentage of the stream that has a sequential pattern); 6) a number of free storage blocks (e.g., blocks with a valid count of zero) that can be allocated for a stream; and 7) a sequential read vs. write ratio of a stream. Although specific examples are given, other performance parameters may be used.

As discussed above, the performance system 260 may determine a performance metric for one or more of the streams 230 using one of the performance parameters (e.g., an amount of write operations/payloads and invalidations of a stream). In another example, the performance system 260 may determine multiple performance metrics for one or more of the streams 230 using multiple performance parameters (e.g., an amount of write operations/payloads and invalidations of a stream and an amount of rewrite invalidations and discard invalidations of a stream). In yet another example, the performance system 260 may determine performance metrics for one or more of the streams 230 using all of the performance parameters.

In an example, the monitoring, tracking and/or determination of the performance metrics may be done in real-time or substantially real-time. For example, the performance system 260 may determine and/or update performance metrics of each stream 230 as various write operations are performed by the data storage device 220. In another example, the performance metrics may be determined based on a learning or modeling process that simulates write operations that the data storage device 220 will perform.

FIG. 3 is a chart 300 that shows example performance metrics of different streams (e.g., Stream A through Stream G) according to an example. Stream A though Stream G may be similar to the streams 230 (FIG. 2A) that were opened by a host device (e.g., host device 210 (FIG. 2A)) on a data storage device (e.g., data storage device 220 (FIG. 2A)).

As shown in FIG. 3, the chart 300 includes a stream type 310 that includes identifying information about each stream provided by the host device. In this example, the host device specified seven different streams: Stream A, Stream B, Stream C, Stream D, Stream E, Stream F and Stream G.

As the data storage device performed various write operations (and other operations associated with the write operations) requested by the host device, a performance system (e.g., performance system 260 (FIG. 2A)) tracked, monitored or otherwise determined one or more performance metrics of each stream.

In the example shown in FIG. 3, the performance system monitored four different performance parameters: an amount of writes per day (e.g., payload percentage) 320; a percentage of rewrite invalidations 330; a percentage of discard invalidations 340; and a percentage of invalidations 350. Each performance parameter has an associated value or performance metric.

For example, Stream A was utilized for one percent (performance metric) of the writes per day 320 (performance parameter), ninety-one percent (performance metric) of the writes were invalidated 350 (performance parameter), three percent (performance metric) of the invalidations were rewrite invalidations 330 (performance parameter), and eighty-nine percent (performance metric) of the invalidations were discard invalidations 340 (performance parameter). Although specific performance metrics and performance parameters are shown, these are for example purposes only.

Referring back to FIG. 2A, once performance metrics for each stream 230 is determined, the controller 240 causes the performance metrics to be provided to the stream classification system 250. The stream classification system 250 classifies the streams 230 into a stream classification based on the performance parameters and associated performance metrics. In an example, the stream classification includes one or more stream sets. Each stream set may include one or more of the original streams specified by the host device. As previously discussed, the streams are classified into various stream sets of the stream classification based on one or more performance metrics and performance parameters.

In some examples, the data storage device 220 may have a maximum number of streams 230 it can support (e.g., due to design limitations and/or hardware/resource constraints). For example, based on the available RAM and/or storage blocks, the data storage device 220 may be able to efficiently support up to four different streams. Accordingly, the stream classification system 250 may be required to take this information into account when classifying the various streams 230 into various stream sets of a stream classification.

In the example shown in FIG. 3, the host device 210 specified and opened seven different streams (e.g., Stream A through Stream G) on the data storage device 220. However, as discussed above, due to hardware constraints, the data storage device 220 may only be able to support four streams. As such, the stream classification system 250 may generate a stream classification in which the seven streams are classified into four or fewer stream sets.

In an example, each stream set in the stream classification is viewed or considered by the data storage device as a single stream. However, each stream set can include up to the number of streams the data storage device 220 can support. Thus, if the data storage device 220 supports four streams, the stream classification system 250 can create up to four stream sets and each stream set can include up to four of the original streams specified by the host device 210. Likewise, if the data storage device 220 supports three streams, the stream classification system 250 can create a stream classification having up to three stream sets, with each stream set including up to three of the original streams specified by the host device 210.

FIG. 4A illustrates a first stream classification 400 in which streams originally specified by a host device were classified into different stream sets of the stream classification 400 according to an example. Each stream set in the stream classification 400 includes one or more streams that have the same or similar performance metrics (or fall within a range of performance metrics) of a particular performance parameter. In the example shown in FIG. 4A, a stream classification system (e.g., stream classification system 250 (FIG. 2A)) classified the streams into the various stream sets based on the invalidation percentage 350 performance parameter.

For example, the stream classification system classified Stream A through Stream G into three stream sets: Stream 1 410; Stream 2 420; and Stream 3 430. In this example, Stream 1 410 includes Stream A, Stream C, Stream D and Stream F—all of which have invalidation percentages (performance parameter) over ninety percent (performance metric); Stream 2 420 includes Stream G which has an invalidation percentage (performance parameter) of less than fifty percent (performance metric); and Stream 3 430 includes Stream B and Stream E—each of which have invalidation percentages (performance parameter) between fifty percent and ninety percent (performance metric).

The stream classification system may determine in real-time or substantially real time, how to classify each stream with respect to performance metrics as well as the ranges of the performance metrics in each stream set. Continuing with the previous example in which the data storage device can support up to four stream sets, each stream set having up to four streams, the stream classification system may determine to add a fourth stream based on the invalidation percentage performance parameter. The fourth stream may include Stream C and Stream F—each of which have invalidation percentages (performance parameter) above ninety-five percent (performance metric). As a result, Stream 1 410 would only include Stream A and Stream D—each of which have invalidation percentages between ninety percent and ninety-five percent. As discussed above, the stream classifications, as well as the performance metrics used in the classification may be based, at least in part, on a current or determined workload and/or a determine profile.

FIG. 4B illustrates a second stream classification 440 that shows how streams opened by the host device may be internally classified by the data storage device according to an example. In the example shown in FIG. 4B, the stream classification system classified Stream A through Stream G into different stream sets based on a two different performance parameters. For example, Stream A through Stream G were classified into different stream sets based on a writes per day (e.g., payload) percentage 320 performance parameter and the discard invalidations percentage 340 performance parameter.

Using these performance parameters, the second stream classification 440 includes three different stream sets. For example, Stream 1 450 includes Stream A, Stream E, Stream D and Stream F—each of which have a payload (e.g., write/day percentage 320) (performance parameter) of less than ten percent (performance metric); Stream 2 460 includes Stream G that has a payload (e.g., write/day percentage 320) (performance parameter) above forty percent (performance metric) and a discard invalidations percentage 340 (performance parameter) less than fifty percent (performance metric); and Stream 3 470 includes Stream B and Stream C, each of which have a payload (e.g., write/day percentage 320) (performance parameter) between ten and fifty percent (performance metric) and a discard invalidations percentage 340 (performance parameter) greater than fifty percent (performance metric).

Although the stream classification system classified the streams into different stream sets based on two different performance parameters (e.g., the writes per day percentage 320 and the discard invalidations percentage 340) and the associated performance metrics, some stream sets may be populated using one of the selected performance parameters (e.g., Stream 1 450 only considers the writes per day percentage 320 performance parameter) while other stream sets may be populated using multiple performance parameters (e.g., Stream 2 460 and Stream 3 460—each of which consider the writes per day percentage 320 performance parameter and the discard invalidations percentage 340 performance parameter).

Referring back to FIG. 2A, when the stream classification system 250 has classified the streams 230 into a stream classification having various stream sets, the performance of the data storage device 220 using the stream classification may be analyzed by the gain determination system 270. The gain determination system 270 determines, based at least in part, on predefined gain criteria, how efficiently (e.g., a gain measurement) the data storage device 220 operates or performs using the stream classification.

In some examples, the predefined gain criteria may be stored by the storage system 280. When determining the gain measurement, one or more gain criteria may be used. Additionally, the number and/or types of gain criteria used to determine the gain measurement may be based on a particular profile and/or workload 235.

Example predefined gain criteria for the data storage device 220 include: 1) a ratio of released data blocks versus new data blocks that are allocated for write operations; 2) a valid count distribution spread over all data blocks in the data storage device 220; 3) a count of free data blocks in the data storage device 220; 4) an amount of garbage collection activity and/or a frequency of garbage collection operations performed by the data storage device 220; 5) a number of sequential read operations from logical block addresses (LBAs) that are consecutive on data blocks associated with stream sets of the stream classification; and 6) an overall write amplification factor (WAF) calculated or determined by the data storage device 220. Although specific gain criteria are discussed, other gain criteria may be used.

In one example, a gain measurement (associated with one or more of the gain criteria described above) of the data storage device 220 using a particular stream classification may be compared against a baseline efficiency score or measurement of the data storage device 220. For example, the gain determination system 270 may have data regarding the ratio of released data blocks versus new data blocks that the data storage device 220 allocated for write operations (e.g., gain criteria 1, above) prior to using any stream classification. If the determined gain measurement of the data storage device 220 using the particular stream classification is above a threshold, the data storage device 220 may use (or continue to use) the particular stream classification.

In another example, a gain measurement (associated with a gain criteria) of a first stream classification (e.g., the first stream classification 400 (FIG. 4A)) may be compared against the gain measurement (associated with the gain criteria) of a second stream classification (e.g., the second stream classification 440 (FIG. 4B)) to determine which stream classification yields the greatest gain measurement for particular gain criteria. In yet another example, a gain measurement of a first stream classification and a gain measurement of a second stream classification may be compared against an expected gain threshold. In an example, the expected gain threshold may be determined based, at least in part, on data obtained during a learning or training process. If the gain measurement of one of the stream classifications exceeds the expected gain threshold, that particular stream classification may be used by the data storage device 220.

In some examples, the gain determination system 270 may determine based, at least in part, on a workload and/or profile 235, which predefined gain criteria to use to determine the gain measurement of the data storage device 220 using a particular stream classification. For example, under a first workload, the gain determination system 270 may determine to use two gain criteria from the set of predefined gain criteria to determine a gain measurement of the data storage device 220 using a particular stream classification. Under a second, different workload, the gain determination system 270 may use three gain criteria from the set of predefined gain criteria to determine the gain measurement of the data storage device 220 using a particular stream classification.

In an example, the data storage system 200 and the processes described herein may be part of, or otherwise integrated with, a training or learning system. In such an example, the learning system may simulate field usage of the data storage device 220.

As part of the simulation, the data storage device 220 may create or otherwise determine a set of predefined stream classifications and store the set of predefined stream classifications in the storage system 280. Each stream classification in the set of predefined stream classifications may be based on different performance parameters and/or performance metrics. For example, stream sets and streams associated with a first stream classification may be based on performance parameters 1 and 4 outlined above while stream sets and streams associated with a second stream classification may be based on performance parameters 2, 3, 4, and 6 outlined above.

In an example, each of the predefined stream classifications may be associated with an expected gain threshold. If it is determined by the data storage device 220, the host device 210 or another monitoring system, that a particular stream classification is not meeting the expected gain threshold, the data storage device 220 may stop using the particular stream classification and use another predefined stream classification. The gain determination system 270 may periodically monitor the performance of the data storage device 220 using the various stream classifications in order to dynamically determine when/whether to switch using stream classifications.

In another example, if it is determined that the performance of the data storage device 220 falls below an expected performance threshold using a particular stream classification, the data storage device 220, and its associated systems, may generate one or more new stream classifications such as described herein. In another example, the data storage device 220, the host device 210 and/or a remote computing device may generate a new stream classification such as will be described below with respect to FIG. 2B.

In another example, a training or learning system may simulate different workloads that will be provided to the data storage device 220. Accordingly, different stream classifications may be selected and used when the same or similar workloads are detected by the data storage device 220. In such an example, the data storage device 220 may periodically monitor (in real-time or substantially real-time) the gain measurements of a selected stream classification and compare it against the expected gain measurement. If the gain measurement of the data storage device using the selected stream classification does not meet the expected gain measurement, the data storage device 220 may switch to another predefined stream classification. The data storage device 220 may compare the previously determined gain measurements (e.g., from the first selected stream classification) with gain measurements using the newly selected stream classification. If the gain measurement of the newly selected stream classification exceeds the previously determined gain measurement, the data storage device 220 may automatically begin using the newly selected stream classification.

Thus, the data storage device of the present application will determine and/or select stream classifications that are the most optimized based on certain profiles (e.g., user profiles) and/or workloads running on a system. This process may be repeated any number of times over a given time period and/or any time a new profile and/or workload is detected.

In some examples, the data storage device 220 may not have the processing power required to classify the streams 230 such as described above. In such examples, the data storage device 220 may provide performance metrics and/or performance parameters to one or more remote devices. The one or more remote devices may then perform the required processing to classify the streams and provide the stream classification to the data storage device 220.

Figure 2B:
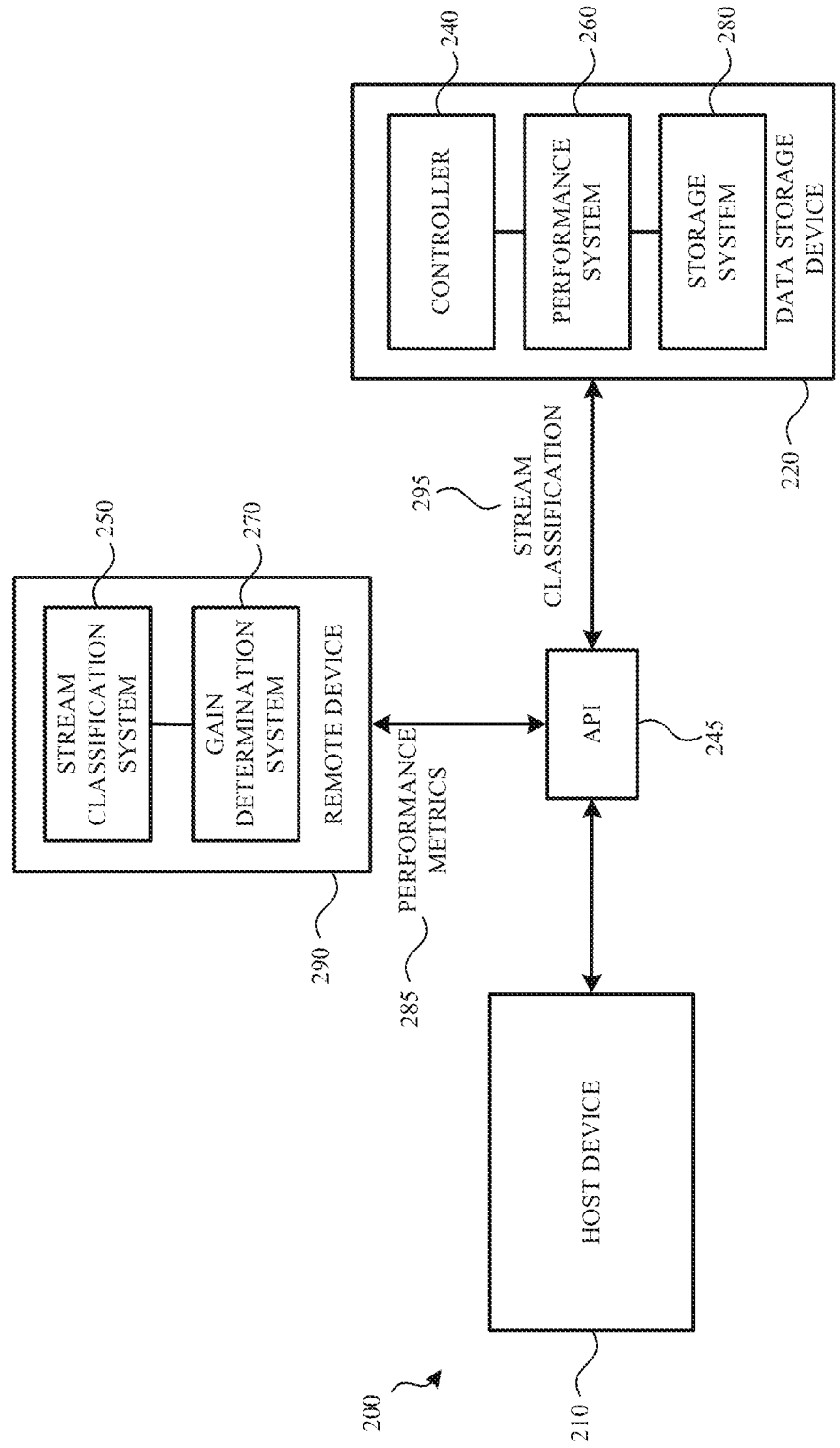
FIG. 2B is a block diagram of another data storage system in which stream classifications are determined by one or more remote devices based on performance metrics provided to the one or more remote devices by a data storage device according to an example.

For example and referring to FIG. 2B, the data storage device 220 may include a controller 240, a performance system 260 and a data storage system 280. As shown in FIG. 2B, the remote device 290 may include a stream classification system 250 and a gain determination system 290. The remote device 290 may be similar to the computing device 110 shown and described with respect to FIG. 1. Additionally, although the remote device 290 is shown as having the stream classification system 250 and the gain determination system 270, the host device 210 may include one or more of the stream classification system 250 and the gain determination system 270.

In this example, each of these systems may function in a similar manner as described with respect to FIG. 2A. For example, the performance system 260 may monitor, under the direction of the controller 240, performance metrics 285 associated with one or more streams associated with the host device 210. The performance metrics 285 may be stored in the storage system 280. The data storage device 220 may provide the performance metrics 285 and/or associated performance parameters to the remote device 290 and/or the host device 210. The data storage device 220 may also provide information regarding the maximum number of streams (e.g., four) the data storage device 220 can support.

In an example, the performance metrics 285 and/or maximum number of streams the data storage device can support are provided to the host device 210 and/or the remote device 290 via an API 245. In another example, the performance metrics 285 may be provided to the host device 210 and/or the remote device 290 via another communication channel including a network connection, a Bluetooth connection or any other communication channel.

When the host device 210 and/or the remote device 290 receive the performance metrics 285, the host device 210 and/or the remote device 290 classify the streams into one or more stream classifications 295 such as described above.

When the streams are classified, the host device 210 and/or the remote device 290 may simulate gain measurements for each of the stream classifications 295. In some examples, the data storage device 220 may provide gain criteria to the remote device 290 and/or the host device 210 via the API 245. In order to determine the gain measurement of the data storage device 220 using the stream classifications 295, the host device 210 may provide workload and/or profile information to the remote device 290. In other examples, this information may be provided to the remote device 290 from the data storage device 220. In yet another example, the workload and/or profile information may be simulated data that was generated or otherwise determined from a training or learning system.

The remote device 290 may generate a first stream classification and provide the first stream classification to the data storage device 220 via the API 245. As the data storage device 220 uses the first stream classification, gain measurements of the data storage device 220 using the first stream classification may be provided to the remote device 290. The gain measurements of the first stream classification may be provided to the remote device 290 in real-time, substantially real-time or at specified intervals.

The remote device 290 may also generate a second stream classification and provide the second stream classification to the data storage device 220 via the API 245. The data storage device 220 may also use the second stream classification and provide gain measurements associated with the second stream classification to the remote device 290 in a similar manner as described above. When the gain measurements are received by the remote device 290, the gain determination system 270 may compare the gain measurements and determine which stream classification should be used by the data storage device 220. The stream classification 295, or information indicating which stream classification 295 the data storage device 220 should use, is provided to the data storage device 220 via the API 245.

In another example, the performance metrics 285 may include gain measurements of the data storage device 220 when the data storage device 220 uses different stream classifications (e.g., one or more predefined stream classifications or one or more newly generated stream classifications). When the gain measurements 285 are received, the remote device 290 (or the host device 210) may compare the gain measurements to past results or expected gain results to determine whether new stream classifications should be identified and/or used. If so, the remote device 290 and/or the host device 210 may update and/or provide new stream classifications 295 to the data storage device 220. This may be done in any number of ways including sending updated stream classifications to the data storage device 220, by setting a priority for specific streams or stream classifications and providing the priority to the data storage device 220, or by sending an index of a new stream classification which is already stored by the data storage device 220.

Figure 5:
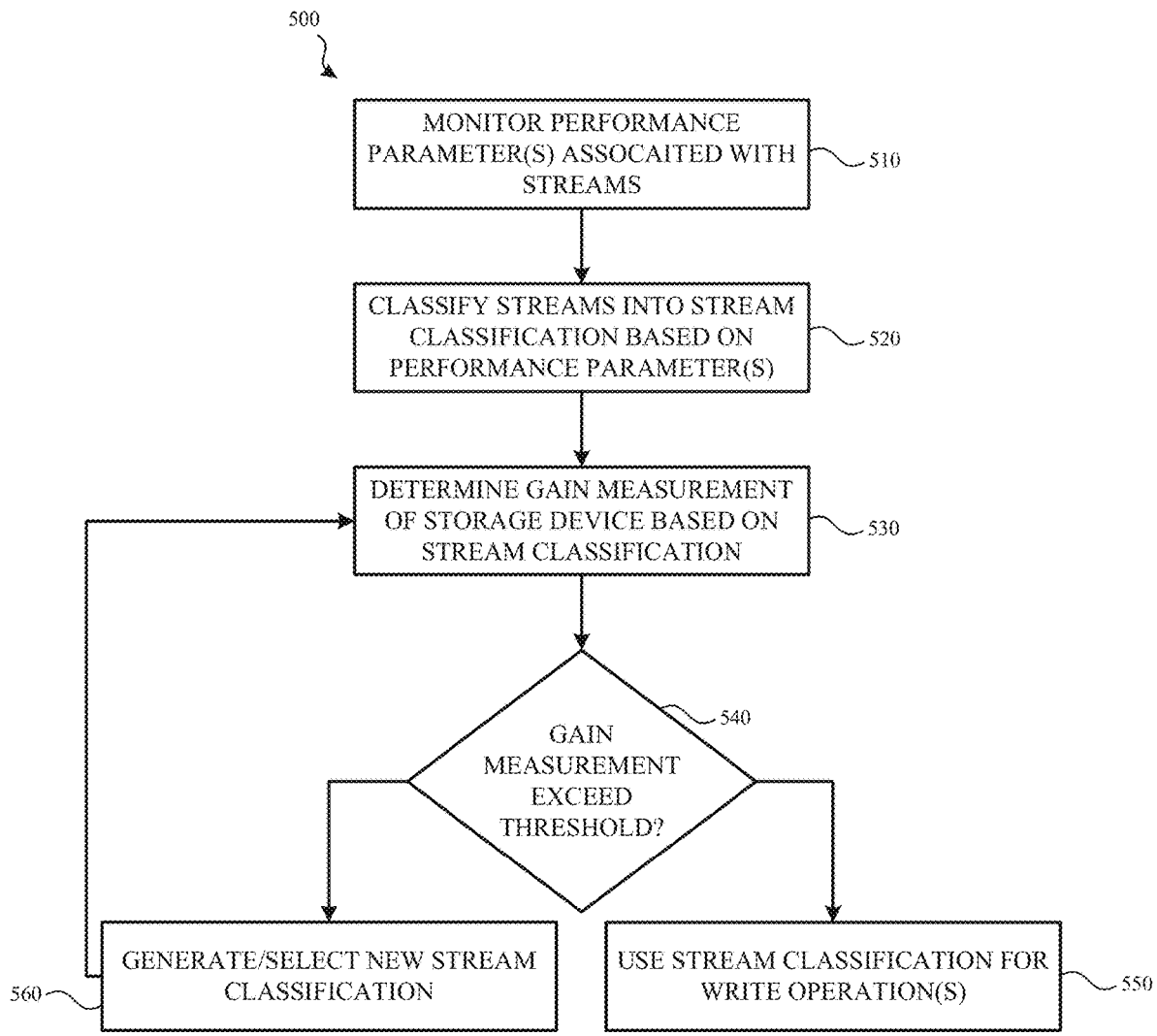
FIG. 5 illustrates a method for classifying streams and selecting a particular stream classification for write operations according to an example.

FIG. 5 illustrates a method 500 for classifying streams and selecting a particular stream classification for write operations according to an example. The method 500, or various operations of the method 500, may be performed by one or more systems of the data storage system shown and described with respect to FIG. 2A and/or FIG. 2B. In another example, method 500, or various operations of method 500, may be performed in a training or learning system in order to obtain simulated data (e.g., simulated performance metrics). The simulated data may then be used to generate predefined stream classifications, predefined gain measurements and/or predetermined baseline efficiency scores of a data storage device.

Method 500 begins when a data storage device monitors (510) performance parameters and performance metrics associated with one or more streams. The performance parameters and associated performance metrics may be monitored using a performance system integrated or otherwise associated with the data storage device.

As explained above, the streams may be specified by and/or opened on the data storage device by a host device. Each stream may be used to write data into specific storage blocks on the data storage device. In an example, the performance parameters are monitored over a time period. The time period may be random or may be predefined. In some examples, the performance parameters and the associated metrics are analyzed or otherwise monitored in view of a workload and/or profile.

The data storage device may then classify (520) the streams into one or more stream classifications. When generating stream classifications, the data storage device (or a remote device and/or a host device) may base the classification of the streams on one or more performance parameters and/or on the maximum number of streams the data storage device can support.

When the one or more streams are classified into stream classifications, a gain measurement of the data storage device, using each of the one or more stream classifications, is determined. In an example, the gain measurement of each of the one or more stream classifications may be determined in real-time or substantially real-time. In another example, the gain measurement of each of the one or more stream classifications may be determined in a simulated environment.

Once the gain measurement of each of the one or more stream classifications is determined, a determination (540) is made as to whether the gain measurement of a particular stream classification exceeds a gain measurement threshold. In an example, the gain measurement threshold may be a baseline efficiency score of the data storage device. For example, the baseline efficiency score of the data storage device may be based on one or more of the gain criteria (e.g., a ratio of released data blocks versus new data blocks that the data storage device allocated for write operations prior to using any of the stream classifications) described herein. In another example, the gain measurement threshold may be an expected gain measurement of the data storage device that was determined in a simulated environment.

If the gain measurement of the particular stream classification exceeds the gain measurement threshold, the data storage device uses (550) (or continues to use) the particular stream classification. However, if the gain measurement of the particular stream classification does not exceed the gain measurement threshold, a new stream classification may be generated (560). Flow may then proceed back to operation 530 and the method 500 continues such as described above.

Figure 6:
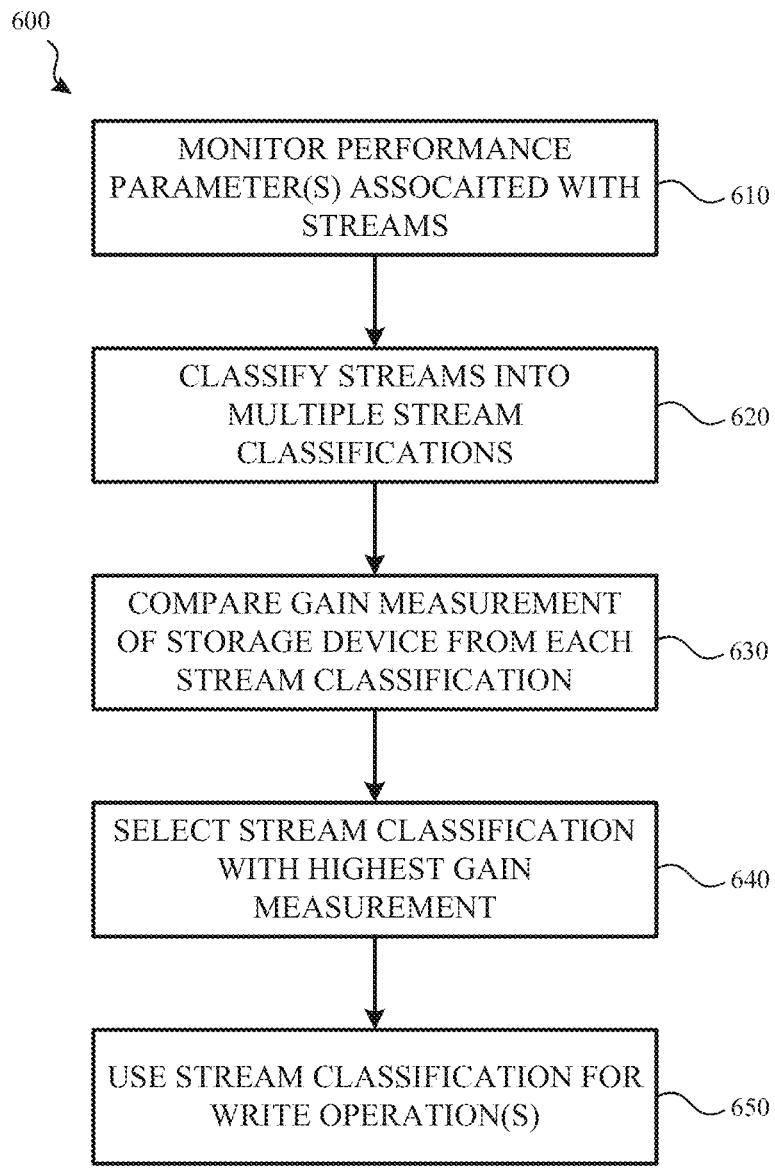
FIG. 6 illustrates a method for comparing gain measurements of two or more stream classifications according to an example.

FIG. 6 illustrates a method 600 for comparing gain measurements of two or more stream classifications according to an example. The method 600, or various operations of the method 600, may be performed by the one or more systems of the data storage system shown and described with respect to FIG. 2A and/or FIG. 2B. In another example, method 600, or various operations of method 600, may be simulated in a training or learning system.

Method 600 begins when performance parameters and/or associated performance metrics of one or more streams are monitored or otherwise identified. In an example, the performance parameters and associated performance metrics of the one or more streams may be monitored and/or identified using a performance system integrated or otherwise associated with a data storage device.

In an example, the performance parameters and/or performance metrics are monitored in real-time, or substantially real-time, over a particular time period. In another example, the performance parameters and/or the performance metrics are identified upon expiration of a time period. The time period may be random, be based on changing workloads and/or profiles, or may be predefined. In an example, information about the monitored performance parameters and associated performance metrics may be provided to a remote device such as described herein.

The streams are then classified (620) into multiple stream classifications. In an example, the streams may be classified into stream classifications by the data storage device. In another example, the streams may be classified into stream classifications by a remote device and/or a host device. When generating stream classifications, the data storage device (or the remote device and/or the host device) may base the classification of the streams on one or more performance parameters and/or on the maximum number of streams the data storage device can support.

Gain measurements of the data storage device using each of the multiple stream classifications are determined and compared (630) to each other. In an example, the comparison may be performed in real-time or substantially real-time.

In another example, the comparison may be performed in a simulated environment. The comparison may be performed by the data storage device. In another example, the comparison may be performed by the remote device or the host device.

The stream classification that causes the data storage device to exhibit the greatest yield (e.g., based on a comparison of the gain measurements of each of the multiple stream classifications) is selected (640). The data storage device may then use (650) the particular stream classification for subsequent write operations.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., computing device 110 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method for classifying streams for a data storage device, comprising:
    receiving a plurality of streams from a host device;
    determining a performance metric for each stream in the plurality of streams, each performance metric being associated with a performance parameter from a set of predefined performance parameters;
    classifying the plurality of streams into a stream classification based, at least in part, on each performance metric, the stream classification including a first stream set and a second stream set, the first stream set including a first stream from the plurality of streams and the second stream set including a second stream from the plurality of streams;

determining a gain measurement associated with the stream classification, the gain measurement being associated with a set of predefined gain criteria; and performing a write operation on a storage block of the data storage device using the stream classification based, at least in part, on the gain measurement.

2. The method of claim 1, wherein the storage block is associated with the first stream set.

3. The method of claim 1, further comprising comparing the gain measurement associated with the stream classification to a baseline efficiency score associated with the data storage device, the baseline efficiency score providing performance information of the data storage device prior to the data storage device performing the write operation using the stream classification.

4. The method of claim 1, further comprising comparing the gain measurement associated with the stream classification to an expected gain measurement threshold.

5. The method of claim 4, further comprising identifying a different stream classification when the gain measurement associated with the stream classification is below the expected gain measurement threshold.

6. The method of claim 1, further comprising comparing the gain measurement associated with the stream classification to a gain measurement associated with a different stream classification.

7. The method of claim 6, further comprising causing the data storage device to use the different stream classification when the gain measurement associated with the different stream classification exceeds the gain measurement associated with the stream classification.

8. A method for classifying streams for a data storage device, comprising:
   storing a first performance metric for a first stream in a plurality of streams associated with a host device, the first performance metric being associated with a performance parameter;
   storing a second performance metric for a second stream in the plurality of streams associated with the host device, the second performance metric being associated with the performance parameter;
   providing information corresponding to the first performance metric for the first stream in the plurality of streams to a remote device;
   providing information corresponding to the second performance metric for the second stream in the plurality of streams to the remote device;
   receiving a stream classification from the remote device, the stream classification including one or more stream sets, wherein:
      at least one of the one or more stream sets includes the first stream and the second stream; and
      the first stream and the second stream are included in the at least one of the one or more stream sets based, at least in part, on the first performance metric and the second performance metric; and
   performing a write operation on a storage block of the data storage device using the stream classification.

9. The method of claim 8, wherein the information corresponding to the first performance metric and the information corresponding to the second performance metric are provided to the remote device via an application programming interface.

10. The method of claim 8, wherein the performance parameter is selected from a group of performance parameters that includes one or more of:

an amount of write operations and invalidations for a stream;
an amount of rewrite invalidations and discard invalidations for a stream;
a valid count percentage for a stream;
an invalidated valid count percentage for a stream;
a determined pattern of a stream;
a determined number of free storage blocks associated with a stream; and
a determined sequential read and sequential write ratio associated with a stream.

11. The method of claim 8, further comprising providing a maximum number of streams supported by the data storage device to the remote device via an application programming interface.

12. The method of claim 11, wherein a maximum number of stream sets in the stream classification is less than or equal to the maximum number of streams supported by the data storage device.

13. The method of claim 12, wherein a maximum number of streams in each stream set is less than or equal to the maximum number of streams supported by the data storage device.

14. A data storage device, comprising:
   a controller; and
   a memory communicatively coupled to the controller and storing instructions which, when executed by the controller, perform operations, comprising:
      performing one or more write operations on storage blocks associated with the data storage device using a first stream classification, the first stream classification including a first stream set having one or more streams associated with a host device and a second stream set having one or more streams associated with the host device;
      determining a gain measurement associated with the first stream classification;
      comparing the gain measurement associated with the first stream classification to an expected gain measurement threshold; and
      performing subsequent write operations on the storage blocks associated with the data storage device using a second stream classification based on the gain measurement associated with the first stream classification falling below the expected gain measurement threshold.

15. The data storage device of claim 14, wherein the expected gain measurement threshold is associated with a workload.

16. The data storage device of claim 14, wherein the expected gain measurement threshold is associated with a profile.

17. The data storage device of claim 14, wherein the gain measurement associated with the first stream classification is based, at least in part, on one or more gain criteria, the one or more gain criteria including one or more of:
   a ratio of released storage blocks versus new storage blocks that are allocated for write operations;
   a determined valid count distribution spread over all storage blocks in the data storage device;
   a determined count of free storage blocks in the data storage device;
   a determined frequency of garbage collection activities performed by the data storage device;
   a determined number of sequential read operations performed by the data storage device; and a determined write amplification factor associated with the data storage device.

18. The data storage device of claim 14, wherein:
each of the one or more streams in the first stream set have a performance metric that falls within a first specified range of a performance parameter; and
each of the one or more streams in the second stream set have a performance metric that falls within a second specified range of the performance parameter.

19. The data storage device of claim 14, further comprising instructions for performing the comparison of the gain measurement of the first stream classification to the expected gain measurement threshold in response to a command received from the host device.

20. The data storage device of claim 14, further comprising instructions for generating a new stream classification based, at least in part on, the gain measurement associated with the first stream classification falling below the expected gain measurement threshold.

\* \* \* \* \*